US009819715B2

(12) United States Patent
Scurtu et al.

(10) Patent No.: US 9,819,715 B2
(45) Date of Patent: Nov. 14, 2017

(54) CLIENT SIDE CONTROL OF ADAPTIVE STREAMING

(75) Inventors: Tudor Scurtu, Neamt (RO); Silviu Vergoti, Bucharest (RO); Andrian Cucu, Bucharest (RO); Mihai Alexandru, Prahova (RO)

(73) Assignee: Adobe Systems Incorporated, San Jose, CA (US)

( * ) Notice: Subject to any disclaimer, the term of this patent is extended or adjusted under 35 U.S.C. 154(b) by 1479 days.

(21) Appl. No.: 13/529,050

(22) Filed: Jun. 21, 2012

(65) Prior Publication Data

US 2013/0346590 A1 Dec. 26, 2013

(51) Int. Cl.
G06F 15/173 (2006.01)
H04L 29/06 (2006.01)

(52) U.S. Cl.
CPC ............ H04L 65/602 (2013.01); H04L 65/80 (2013.01); *H04L 65/4084* (2013.01)

(58) Field of Classification Search
CPC ..... H04L 65/80; H04L 65/60; H04L 65/4076; H04L 65/4084; H04L 65/605; H04L 67/38; H04L 65/403; H04L 65/602; H04L 65/607; G06F 3/017; G06F 17/5022; G06F 17/5036
See application file for complete search history.

(56) References Cited

U.S. PATENT DOCUMENTS

| | | | | |
|---|---|---|---|---|
| 6,492,942 B1* | 12/2002 | Kezys | ...................... | H01Q 3/26 342/368 |
| 2005/0076136 A1* | 4/2005 | Cho | .................. | H04L 29/06027 709/231 |
| 2006/0156352 A1* | 7/2006 | Smith | .................... | H04N 7/167 725/86 |
| 2009/0274133 A1* | 11/2009 | Watanabe | ............. | H04L 1/0009 370/338 |
| 2009/0300203 A1* | 12/2009 | Virdi | .................. | H04N 21/2358 709/231 |
| 2010/0235438 A1* | 9/2010 | Narayanan | .............. | H04L 65/60 709/203 |
| 2013/0064110 A1* | 3/2013 | Polinati | ............... | H04L 41/5035 370/252 |

\* cited by examiner

*Primary Examiner* — Shean Tokuta
*Assistant Examiner* — Thao Duong
(74) *Attorney, Agent, or Firm* — Kilpatrick Townsend & Stockton LLP

(57) ABSTRACT

One embodiment includes implementing adaptive streaming by a switch manager application executed at a client device. The switch manager application can determine a respective weight for a plurality of switching rules. Each switching rule can include one or more criteria for generating a recommended quality level. Each weight can include data describing a reliability of the rule. The switch manager application can select, based at least partially on the respective weight of the at least one switching rule, at least one switching rule of the plurality of switching rules to generate a recommendation. Another embodiment includes the switch manager application generating a recommendation including a quality level and a confidence level from each of the plurality of switching rules. The switch manager application can determine a selected quality level based on the weights of the switching rules and the quality levels and confidence levels of the recommendations.

18 Claims, 4 Drawing Sheets

CLIENT SIDE CONTROL OF ADAPTIVE STREAMING

TECHNICAL FIELD

This disclosure relates generally to computer-implemented methods and systems and more particularly relates to adaptive streaming controlled by a client computing device.

BACKGROUND

Online content providers can provide electronic content to computing devices via networks such as the internet. The term "electronic content" refers to any type of media that can be displayed or played on mobile and other computing devices. Computing devices include devices such as desktop computers, laptop computers, smart phones, tablet computers, personal digital assistants, etc. Electronic content can include text or multimedia hosted on websites, such as standard web pages or mobile web pages specifically formatted for display on computing devices. Electronic content can also include application software developed for computing devices that is designed to perform one or more specific tasks at the computing device.

Electronic content can be streamed from a server system to a client computing device. Streaming electronic content can include, for example, live and on-demand audiovisual content provided using a streaming protocol, such as (but not limited to) real time messaging protocol ("RTMP"), hypertext transfer protocol ("HTTP") dynamic streaming ("HDS"), and HTTP Live Streaming ("HLS"). A server system can provide multiple renditions of electronic content having different quality levels. The ability of the client computing device to render streaming electronic content without interruptions or buffering can be negatively impacted by conditions such as the bandwidth of a network connection between the client computing device and the server system and/or the load on a processor of the client computing device.

SUMMARY

One embodiment is a switch manager application executed at a processor. The switch manager application determines a respective weight for each of a plurality of switching rules. Each switching rule includes one or more criteria used to generate a recommended quality level. Each weight describes a reliability of the rule. The switch manager application selects at least one switching rule of the plurality of switching rules to generate a recommendation. The selection of the at least one switching rule is based at least partially on the respective weight of the at least one switching rule.

In another embodiment, for each of the plurality of switching rules, the switch manager application generates a respective recommendation. Each recommendation includes the recommended quality level and a confidence level. The confidence level describes the availability of quality-of-service data used by the rule. The switch manager application determines a selected quality level based on the respective weights of the plurality of switching rules and the respective recommended quality levels and confidence levels of the recommendations.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
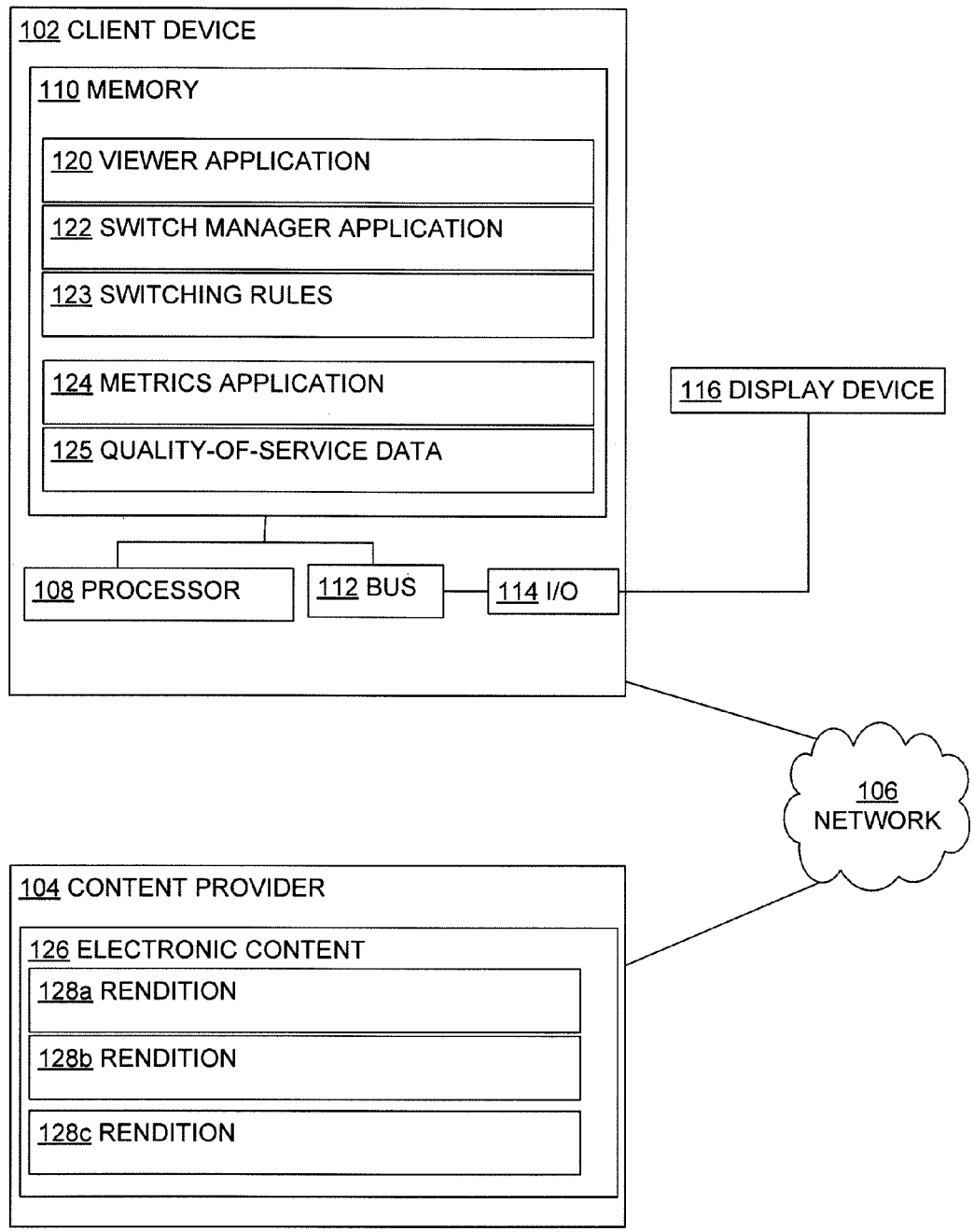
FIG. 1 is a block diagram depicting example computing systems for implementing certain embodiments.

Computer-implemented systems and methods are disclosed for providing adaptive streaming control by a client computing device. Adaptive streaming can include using switching rules to determine that a client device downloading or otherwise accessing electronic content, such as streaming audiovisual content, should switch between renditions of the electronic content. One or more applications executed at a client device can control the switches between renditions having different quality levels during playback of electronic content in order to maintain a pre-determined level of quality with minimum interruptions based on the limited resources on the client machine. Client side control of adaptive streaming can use different classifications for switching rules, weights for switching rules, and confidence levels for recommended bit rates. Client side control can allow a client device to select a rendition of electronic content in an adaptive manner.

In accordance with one embodiment, a client device can execute a switch manager application to adaptively select a switching rule based on the reliability (e.g., weight) of the switching rule. The client device can select and apply one or more switching rules to determine whether to select a different rendition of streaming electronic content from a content server. The content server can store multiple renditions of the electronic content. Each rendition can be a version of the electronic content encoded at a different bit rate. The client device can select different renditions of the electronic content in order to minimize interruptions in the rendering or other use of the electronic content at the client device. For example, a rendition encoded at a higher bit rate may be suitable for high-speed network connections between the client device and the content server and a rendition encoded at a lower bit rate may be suitable for low-speed network connections between the client device and the content server. A switching rule can be applied by the switch manager application to provide a recommendation of whether to switch from a rendition currently being rendered at the client device to a different rendition provided by the content server. The recommendation generated using the switching rule can be based on criteria such as (but not limited to) the bandwidth of the network connection, the processing power of the client device, whether the current rendition has historically caused the client device to enter a buffering state, etc. Adaptively selecting a switching rule based on the reliability of the switching rule can increase the reliability of a decision by the client device to select a different rendition than a current rendition.

In an example embodiment, the client side control of adaptive streaming can be implemented by a switch manager application executed at a client device. The switch manager application can determine a respective weight for a plurality of switching rules. Each switching rule can include one or more criteria used to generate a recommended quality level. Each weight can include data describing a reliability of the rule. The switch manager application can generate a recommendation from each of the plurality of switching rules. Each recommendation can include the recommended quality level and a confidence level. The confidence level can describe the availability of quality-of-service data used by the rule. The switch manager application can determine a selected quality level based on the weights of the switching rules and the quality levels and confidence levels of the recommendations.

As used herein, the term "electronic content" is used to refer to any type of media that can be rendered for display or use at a computing system or other electronic device. Electronic content can include text or multimedia files, such as images, video, audio, or any combination thereof. Electronic content can also include application software that is designed to perform one or more specific tasks at a computing system.

As used herein, the term "rendition" is used to refer to a copy of an asset provided to a client device. Different renditions of electronic content can be encoded at different bit rates and/or bit sizes for use by client devices accessing electronic content over network connections with different bandwidths. A bit rate and/or bit size can correspond to a quality level. For example, an asset such as a video clip can include five renditions of the video clip, where each rendition has a different quality level associated with different bit rates.

As used herein, the term "asset" is used to refer to an item of electronic content included in a multimedia object, such as text, images, videos, or audio files. As used herein, the term "image asset" is used to refer to a digital image included in a multimedia object. As used herein, the term "video asset" is used to refer to a video file included in a multimedia object. As used herein, the term "text asset" is used to refer to text included in a multimedia object.

As used herein, the term "quality level" is used to refer to any measure or other indicator indicative of an amount of degradation associated with a rendition of an asset as compared to a source copy of any asset. A quality level for electronic content such as audio and/or video content can be determined using criteria such as, but not limited to, the signal-to-noise ratio or peak signal-to-noise ratio between source copy of the asset and the rendition of the asset provided to a client device. A given quality level for a rendition can correspond to the rendition being encoded using a given bit rate.

The switch manager application can configure a viewer application to dynamically switch between different renditions of electronic content being rendered for display or use at a client device. Dynamically switching between different versions of electronic content can provide the highest quality rendition based on the capabilities of the client device accessing the electronic content via a data network. A viewer application can download, stream, or otherwise access electronic content via a network. The viewer application can interrogate the switch manager application at certain predetermined intervals. At each interval, the switch manager application can select a rendition having a quality level.

The switch manager application can use one or more switching rules to determine which rendition to select from one or more renditions available from a content provider. A switching rule can include one or more criteria used to generate a recommendation. The one or more criteria can be based on one or more types of quality-of-service data accessible by the switch manager application.

As used herein, the term "quality-of-service" ("QoS") is used to refer a capability of a computing device to provide a certain level of performance for a data flow. QoS data can include data describing the performance of a computing device with respect to a data flow. Non-limiting examples of QoS data can include a bit rate, a delay, packet delay variation between end-to-end one-way delay among selected packets in a flow and any lost packets being ignored, packet dropping probability and/or bit error rate.

The switch manager application can determine a weight associated with each of the switching rules. The weight of a switching rule can include data describing a reliability of the rule. The switch manager application can determine a reliability of a switching rule based on whether a recommended quality level generated using the switching rule results in one or more QoS parameters exceeding a pre-determined threshold. For example, a switch manager application can determine that the recommended quality levels generated using a given switching rule have historically caused unacceptably high levels of delay, packet delay variation, packet dropping probability and/or bit error rate. The switch manager can thus assign a lower weight to the switching rule describing the lower reliability of the rule.

The switch manager application can apply one or more switching rules to generate a recommendation. A recommendation can include a recommended quality level and a confidence level. The recommended quality level can correspond to an ideal bit rate for a rendition to be downloaded or otherwise accessed by the viewer application. The recommended quality level may not correspond to a quality level of any of the renditions available from a content provider.

The confidence level can include data describing the availability and quantity of QoS data used by the switching rule and/or buffering and rendering conditions of the viewer application. The recommended bit rate can be inversely related to the confidence level such that the confidence level increases as the recommended bit rate decreases. For example, a switching rule that cannot provide a recommended bit rate can be associated with a confidence level of zero. Additionally or alternatively, the confidence level can depend on the user experience quality that is deduced from the QoS data. The recommended bit rate may not necessarily be inversely related to the confidence level.

The switch manager application can determine a recommendation based on a weighted average of recommendations determined from multiple switching rules. The switch manager application can configure the viewer application to select a rendition having a quality level associated with a bit rate less than or equal to the recommendation.

One embodiment of a switching rule is a bandwidth rule. A bandwidth rule can use data describing how electronic content has been accessed by the client device historically, the bandwidth of the network connection between the client device and the content provider, and a maximum tolerable bit rate for the client device. The switch manager application can apply a bandwidth rule to determine a recommendation based on the bandwidth of the network connection between the content provider and the client device.

Another embodiment of a switching rule is a bandwidth buffer rule. The switch manager application can apply a bandwidth buffer rule to determine a recommendation based on the bandwidth of the network connection and buffering at the client device.

As used herein, the term "network connection" refers to a communication channel of a data network. A communication channel can allow at least two computing systems to communicate data to one another. A communication channel can include an operating system of a first computing system using a first port or other software construct as a first endpoint and an operating system of a second computing system using a second port or other software construct as a second endpoint. Applications hosted on a computing system can access data addressed to the port. For example, the operating system of a first computing system can address packetized data to a specific port on a second computing system by including a port number identifying the destination port in the header of each data packet transmitted to the second computing system. When the second computing system receives the addressed data packets, the operating system of the second computing system can route the data packets to the port that is the endpoint for the socket connection. An application can access data packets addressed to the port.

Another embodiment of a switching rule is a hardware capabilities rule. The switch manager application can apply the hardware capabilities rule to generate a recommended bit rate based on one or more hardware capabilities of the client device. Hardware capabilities can include, for example, battery life, memory, processing power, and the like. In one embodiment, a hardware capabilities rule can determine processing power based on the number of dropped frames per second for the electronic content rendered for display or use by the viewer application. Reduced processing power can cause an increase in the number of dropped frames. Reduced processing power can prevent the processor from decoding every frame in electronic content being rendered for display or use. The processing power can be determined by the capabilities of the processor of the client device and the number of applications being executed by the processor. Executing multiple applications at the client device can reduce the processing power allocated to the viewer application. Reducing the processing power allocated to the viewer application can reduce the capability of the viewer application to decode each frame of the electronic content.

Another embodiment of a switching rule is a content utilization rule. The switch manager can apply the content utilization rule to generate a recommendation based on how the electronic content is being rendered for display or use at the client device. In one embodiment, a content utilization rule can describe a size of a window in which electronic content is being rendered for display, where the described window size is relative to the size of the display screen. For example, applying a content utilization rule may generate a higher recommendation for a viewer application rendering electronic content for full-screen display at a client device. A lower recommendation for a full-screen display may produce pixeling and/or drain processing power. To this end, a lower recommendation on larger displays and a higher recommendation on smaller displays may be as detrimental to user experience as having an unstable connection with the client device. In another embodiment, a content utilization rule can describe a type of display device for which the client device renders the electronic content. Electronic content rendered for display or use at a first display device included in or in communication with the client device can result in a first recommendation. Electronic content rendered for display or use at a second display device included in or in communication with the client device can result in a second recommendation. For example, a lower recommended bit rate can be generated for electronic content being rendered for display or use by a client device using a low resolution screen, such as the screen of a tablet computer, and a higher recommended bit rate can be generated for electronic content being rendered for display or use by the client device using a high resolution, such as a high-definition television coupled to the tablet computer via an HDMI output.

In additional or alternative embodiments, a metrics application can determine a confidence level for a switching rule. The metrics application can alternatively be included in the switch manager application or in a separate application. The metrics application can monitor and store QoS data and organize the QoS data into one or more metrics. The metrics application can determine a confidence level based on the reliability of QoS data used by the switching rule. For example, a metrics application can determine an average bandwidth metric from QOS data. The metrics application can determine that insufficient data is available to compute an average bandwidth. The metrics application can output an average bandwidth metric indicating that an average bandwidth rule is invalid or has a low reliability.

In additional or alternative embodiments, each switching rule can be categorized as either a normal switching rule or an emergency switching rule. A normal switching rule can include one of the switching rules for which recommendations are averaged. A normal switching rule can allow the switch manager application to select a rendition with a higher quality level than a current rendition. A current rendition can be the rendition of the electronic content that a viewer application is rendering for display or use at the client device. The emergency switching rules can be switching rules for which recommendations are not averaged. Applying an emergency switching rule can generate a recommendation equal to or less than a bit rate for a current rendition. An emergency switching rule can be used to determine whether a bit rate for a rendition being rendered can be sustained. An emergency switching rule can allow the switch manager application to select a rendition with the same or lower quality level.

The switch manager application can evaluate each of the emergency switching rules. The switch manager application can generate a recommendation from an emergency switching rule associated with a high confidence level. The switch manager application can configure the viewer application to select a rendition associated with a bit rate less than or equal to the recommendation from the emergency switching rule associated with a high confidence level.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Referring now to the drawings, FIG. 1 is a block diagram depicting example computing systems for implementing certain embodiments. The example computing systems include a client device 102 and a content provider 104 in communication via a network 106.

The client device 102 includes a computer-readable medium, such as a processor 108 communicatively coupled to a memory 110, that executes computer-executable program instructions and/or accesses information stored in the memory 110. The processor 108 may comprise a microprocessor, an application-specific integrated circuit ("ASIC"), a state machine, or other processor. The processor 108 can include any number of computer processing devices, including one. Such a processor can include or may be in communication with a computer-readable medium. The computer-readable medium stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language. Non-limiting examples of a suitable programming language can include C, C++, C#, Visual Basic, Java, Python, Perl, JavaScript, and ActionScript.

The client device 102 may also comprise a number of external or internal devices such as a mouse, a CD-ROM, DVD, a keyboard, a display, audio speakers, one or more microphones, or any other input or output devices. For example, FIG. 1 depicts the client device 102 having an input/output ("I/O") interface 114 and a display device 116. A display device 116 can include (but is not limited to) a screen integrated with a client device 102, such as a liquid crystal display ("LCD") screen, or an external device, such as a monitor. A bus 112 can be respectively included in the client device 102. The bus 112 can communicatively couple one or more components of the client device 102.

FIG. 1 also illustrates the memory 110 of the client device 102 including a viewer application 120, a switch manager application 122, switching rules 123, a metrics application 124, and quality-of-service ("QoS") data 125. The viewer application 120 can include one or more software modules. The viewer application 120 can configure the processor 108 to retrieve one or more renditions 128a-c of the electronic content 126 provided by the content provider 104 via the network 106. The viewer application 120 can configure the processor 108 to render a rendition of the electronic content 126 for display or use at the display device 116. The switch manager application 122 can include one or more software modules. The switch manager application 122 can configure the viewer application 120 to a given rendition of the electronic content 126 based on the switching rules 123. The metrics application 124 can include one or more software modules. The metrics application 124 can configure the processor 108 to analyze the QoS data 125 to generate one or more metrics describing the performance of the viewer application 120 and/or the switch manager application 122. Although FIG. 1 depicts the viewer application 120, the switch manager application 122, and the metrics application 124 as separate modules, each application can be included as a software module of a single application.

The client device 102 can include any suitable computing device for communicating via a network 106 and executing the viewer application 120, the switch manager application 122, and/or the metrics application 124. Non-limiting examples of a computing device include a desktop computer, a tablet computer, a smart phone, or any other computing device suitable for rendering the electronic content 126.

The content provider 104 can provide the electronic content 126 via the network 106. Such electronic content 126 may be resident in any suitable computer-readable medium and execute on any suitable processor. In one embodiment, the electronic content 126 can reside in memory at the content provider 104. In another embodiment, the electronic content 126 can be accessed by the content provider 104 from a remote location via the network 106 and provided to the client device 102. The electronic content 126 can include the renditions 128a-c. Each of the renditions 128a-c can include a copy of some or all of the electronic content 126 encoded at a given bit rate and/or bit size.

The content provider 104 can include any suitable computing system for hosting the electronic content 126. In one embodiment, the content provider 104 may be a single computing system. In another embodiment, the content provider 104 may be a virtual server implemented using multiple computing systems connected in a grid or cloud computing topology.

Figure 2:
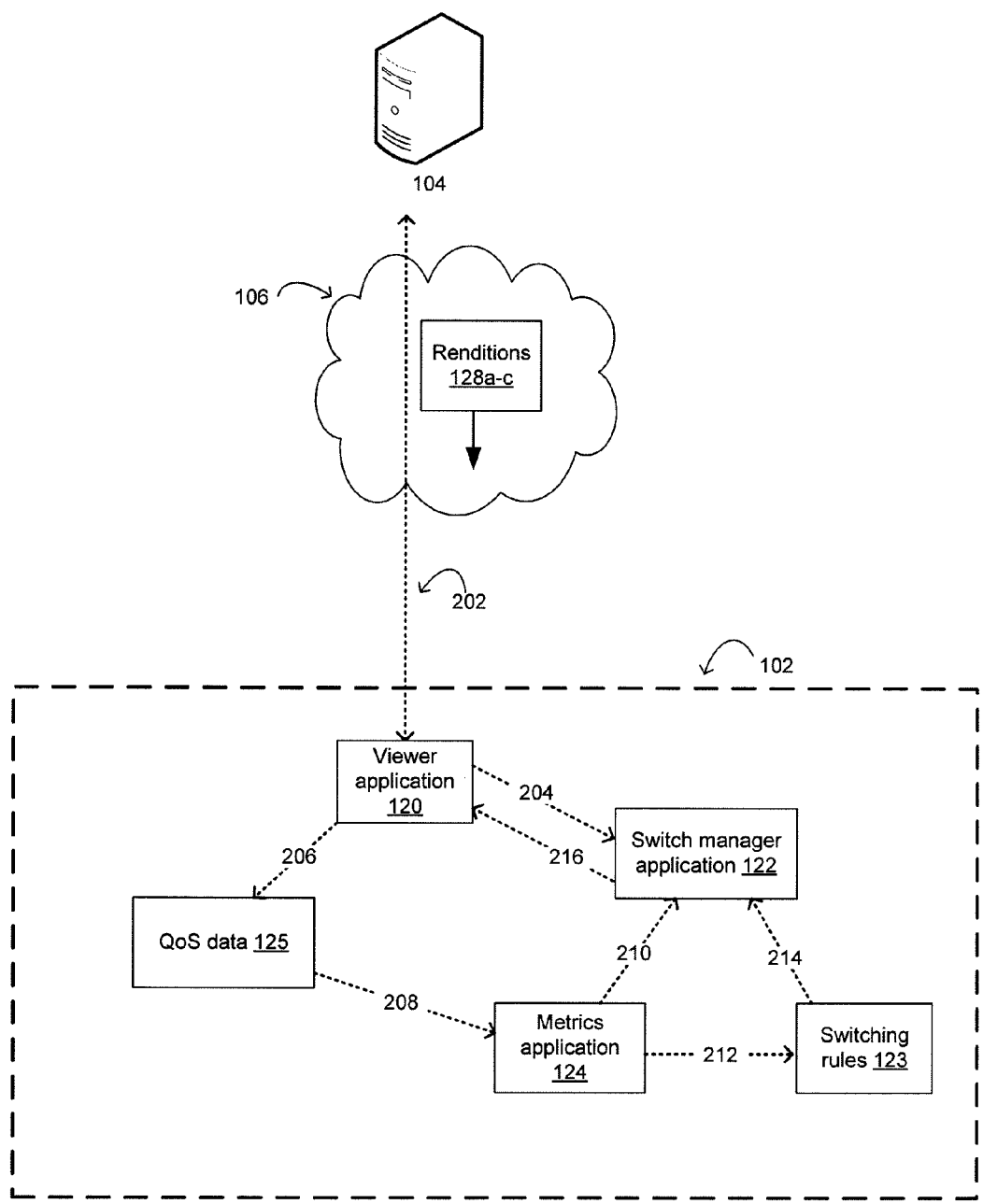
FIG. 2 is a modeling diagram illustrating an example flow of communications for adaptive streaming controlled by a client device.

The viewer application 120 and the switch manager application 122 can be executed by the processor 108 to provide adaptive streaming at the client device 102. FIG. 2 is a modeling diagram illustrating an example flow of communications for adaptive streaming controlled by a client device 102.

The client device 102 can establish a network connection 202 with the content provider 104. The viewer application 120 can be executed at the client device 102 to establish the network connection 202. The network connection 202 can be used to communicate packetized data between the client device 102 and the content provider 104. The content provider 104 can provide one or more of the renditions 128a-c to the client device 102 in response to a request for a respective rendition generated by the viewer application 120.

For example, a content provider 104 can provide electronic content 126 that includes streaming audiovisual content. The viewer application 120 can access the streaming audiovisual content by retrieving one or more of renditions 128a-c via the network connection 202. The content provider 104 can provide a rendition as packetized data. The viewer application 120 can configure the processor 108 to render a selected rendition for display or use.

The viewer application 120 can maintain a minimum buffer in the memory 110. The minimum buffer can be used to store data including a rendition retrieved from the content provider 104. The buffer can include a play head at a first end of the buffer representing electronic content being rendered by the processor 108 of the client device 102. The buffer can also include a buffer head at a second end of the buffer. The buffer head can include data including electronic content being downloaded or otherwise retrieved from the content provider 104 via the network connection 202. A buffering state can be caused by the viewer application 120 rendering electronic content at a higher rate than the electronic content is being downloaded. Rendering electronic content at a higher rate than the electronic content is being downloaded can deplete the buffer. Depleting the buffer can cause a buffering state where the viewer application 120 to pauses or ceases rendering the electronic content 126 until the buffer is refilled to a pre-defined threshold.

The viewer application 120 can communicate with the switch manager application 122 to prevent or reduce the likelihood of the viewer application 120 selecting a rendition causing the viewer application 120 to enter a buffering state. The viewer application 120 can send a message 204 to the switch manager application 122. The message 204 can cause the switch manager application 122 to determine whether the viewer application 120 can or should switch to a different rendition having a different bit rate. The viewer application 120 can send a message 204 to the switch manager application 122 at pre-determined intervals during the rendering and/or retrieving of electronic content 126 from the content provider 104.

The viewer application 120 can also monitor and store one or more data 206 associated with a rendition of the electronic content 126 rendered. The viewer application 120 can organize and store the data 206 as the QoS data 125.

The metrics application 124 can retrieve one or more subsets 208 of the QoS data 125. The metrics application 124 can generate metrics describing a reliability of one or more of the switching rules 123. The metrics application 124 can provide one or more metrics 210 to the switch manager describing a respective reliability for one or more of the switching rules 123. The metrics application 124 can also generate metrics describing a confidence level for a respective recommendation generated using one or more of the switching rules 123. The metrics application 124 can provide one or more metrics 214 to the switching rules 123. The metrics 214 can be associated with a confidence level for recommendations generated using respective switching rules.

In response to receiving a message 204 from the viewer application 120, the switch manager application 122 can determine a quality level for a rendition of electronic content 126 to be retrieved by the viewer application 120. The switch manager application 122 can apply one or more of the switching rules 123 to generate a recommendation. The switch manager application 122 can determine an ideal quality level based at least in part on the recommendations generated from the switching rules 123. The switch manager application 122 can also determine the ideal quality level based on the metrics 210 provided by the metrics application 124. The switch manager application 122 can use the ideal quality level to identify a suitable quality level by communicating data 216 describing the quality level. The data 216 can also identify one of the renditions 128a-c associated with a quality level less than or equal to the suitable quality level. The viewer application 120 can initiate a switch to the new quality level by retrieving the rendition identified by the data 216.

Figure 3:
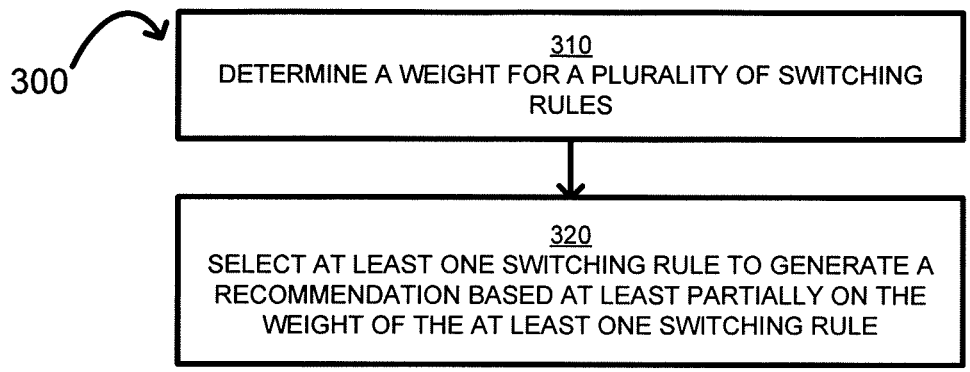
FIG. 3 is a flow chart illustrating an example method for selecting a switching rule for adaptive streaming at a client device.

FIG. 3 is a flow chart illustrating an example method 300 for selecting a switching rule for adaptive streaming at a client device 102. For illustrative purposes, the method 300 is described with reference to the system implementations depicted in FIGS. 1-2. Other implementations, however, are possible.

The method 300 involves determining a weight for a plurality of switching rules, as shown in block 310. The switch manager application 122 can be executed by the processor 108 of the client device 102 to determine the weight for the switching rules.

In one embodiment, the switch manager application 122 can assign a configurable weight to each of the switching rules 123. The weight assigned to each of the rules can allow the switch manager application 122 to avoid selecting an unreliable quality level. The switch manager application 122 can determine a reliability of a switching rule based on analyzing a history of recommended quality levels generated using the switching rule.

A history of decisions by the switch manager application 122 can be stored in the memory 110 or in another storage medium accessible by one or more of the viewer application 120 and the switch manager application 122. A history of decisions by the switch manager application 122 can include a series of quality levels selected by the switch manager application 122 using a given switching rule and one or more emergency down-switches. An emergency down-switch can involve the viewer application 120 selecting a rendition having a lower quality level in response to an event indicating unsatisfactory playback of the electronic content 126. An event indicating unsatisfactory playback of the electronic content 126 can include a buffering state. The switching rule can be deemed unreliable based on the history including a pre-determined number of emergency down-switches from a quality level.

For example, a series of quality levels can be described by an index associated with each quality level (from 1 to N starting with the lowest in quality). A record of decisions can include "1→2→4→2→5→3 (emergency down-switch) →3→3→4→4."

For a record including no emergency down-switches, a reliability of a switching rule can be calculated using an example formula:

$$1 - \frac{downSwitchesFrom^2}{switchesFrom \times \left(\frac{historyLength}{2}\right)}$$

The variable downSwitchesFrom can describe the number of decisions to switch from a quality level determined by the switch manager application 122 using a rule to a lower quality level. The variable switchesFrom describe the number of decisions to switch to a higher quality level or to remain at the current quality level. The variable historyLength can describe a length of the history of decisions of the switch manager application 122. The formula can provide a reliability between zero (inclusive) and one (inclusive). The switch manager application 122 can be configured to disallow switches to quality levels with a value of reliability below a pre-determined threshold.

In additional or alternative embodiments, the metrics application 124 can provide one or more metrics 210 to the switch manager application 122 for use in determining a weight for the one or more switching rules 123. Examples of the metrics 210 can include, but are not limited to, an actual bit rate metric, a bandwidth metric, a buffer fragments metric, and a dropped-frames-per-second ("DFPS") metric.

An actual bit rate metric can describe an actual bit rate of a quality level of a current rendition currently being downloaded or otherwise retrieved by the viewer application 120. The actual bit rate metric can be calculated based on at least one fragment of electronic content. The actual bit rate metric can be computed by dividing the size of the fragment of electronic content in kilobits to the duration in seconds that the fragment of electronic content is rendered for display or use by the viewer application 120. Each fragment of electronic content can be associated with a weight, where fragments accessed at a later point in time are associated with higher weights.

An example formula for computing the actual bit rate for n fragments (where fragment 0 is the most recently downloaded) is:

$$\frac{\frac{size_0}{playDuration_0} \times weight_0 + \frac{size_1}{playDuration_1} \times weight_1 + \ldots \frac{size_{n-1}}{playDuration_{n-1}} \times weight_{n-1}}{weight_0 + weight_1 + (\ldots weight)_{n-1}}$$

The variable size can describe the size of the fragment of electronic content in kilobits. The variable playDuration can describe duration in seconds that the fragment of electronic content is rendered for display or use by the viewer application 120.

A bandwidth metric can describe a bandwidth available to the client device 102 over the network connection 202. The bandwidth metric can be determined as a number of bytes per second ("B/s"). The bandwidth metric can be calculated on at least on a fragment of data, such as a packet, by dividing the size of the fragment in bytes by the download duration in seconds. An example formula for computing the bandwidth for n fragments, where fragment 0 is the most recently downloaded) is:

$$\frac{\frac{size_0}{dlDuration_0} \times weight_0 + \frac{size_1}{dlDuration_1} \times weight_1 + \ldots \frac{size_{n-1}}{dlDuration_{n-1}} \times weight_{n-1}}{weight_0 + weight_1 + \ldots weight_{n-1}}$$

The variable size can describe the size of the fragment of electronic content in kilobits. The variable dlDuration can describe the download duration of the fragment. A higher weight can be assigned fragments retrieved by the viewer application 120 at a later point in time.

A buffer fragments metric can describe the number of whole fragments in the buffer.

A DFPS metric can describe a number of dropped frames per second over a configurable amount of time. The DFPS metric can be calculated by dividing the number of dropped frames by the amount of time considered.

The method 300 further involves selecting at least one switching rule of the plurality of switching rules to generate a recommendation, as shown in block 320. The selection of the at least one switching rule is based, at least partially, on the respective weight of the at least one switching rule. The switch manager application 122 can be executed by the processor 108 of the client device 102 to select the at least one switching rule.

One embodiment of a switching rule is a bandwidth rule. The bandwidth rule can describe how electronic content has been accessed by the client device historically, the bandwidth of the network connection between the client device and the content provider, and/or a maximum tolerable bit rate for the client device. The switch manager application can apply a bandwidth rule to determine a recommended bit rate based on the bandwidth of the network connection between the content provider and the client device. The bandwidth rule can recommend a value of the bandwidth metric as an ideal bit rate.

Another embodiment of a switching rule is a bandwidth buffer rule. The switch manager application can apply a bandwidth buffer rule to determine a recommended bit rate based on the buffering of the client device. The bandwidth buffer rule can account for data stored in the buffer in generating a recommendation. Applying the bandwidth buffer rule can prevent the recommendation of a lower bitrate than the currently downloading bit rate based on sufficient electronic content being stored in the buffer. The sufficiency of electronic content stored in the buffer can be defined by a configurable threshold specifying the minimum number of whole fragments of electronic content 126 stored in the buffer. An ideal bit rate recommended by the bandwidth buffer switching rule can be a bit rate recommended by the bandwidth rule recommended bit rate for a bit rate greater than or equal to the currently downloading bit rate or for the buffer storing fewer fragments than a predefined threshold. An ideal bit rate recommended by the bandwidth buffer switching rule can be the currently downloading bit rate if a bit rate recommended by the bandwidth rule is less than the currently downloading bit rate.

Another embodiment of a switching rule is a hardware capabilities rule. The switch manager application 122 can apply the hardware capabilities rule to generate a recommended bit rate based on one or more hardware capabilities of the client device 102. Hardware capabilities can include, for example, battery life, memory, processing power, and the like.

The processing power can be determined by the capabilities of the processor of the client device 102 and the number of applications being executed by the processor. Executing multiple applications at the client device 102 can reduce the processing power allocated to the viewer application. Reducing the processing power allocated to the viewer application can reduce the capability of the viewer application to decode each frame of the electronic content.

An example of a hardware capabilities rule is a DFPS rule. Reduced processing power can cause an increase in the number of dropped frames by preventing the processor from decoding every frame in electronic content being rendered for display or use. The DFPS rule can be configured with a maximum value of allowed dropped-frames-per-second ratio. The ratio can be computed by dividing the result of the DFPS metric by the frames-per-second ("FPS") characteristic of electronic content being retrieved by the viewer application 120.

The DPFS rule can be applied based on the quality level of the rendition currently being rendered being the same as the quality level of the rendition currently being downloaded or otherwise retrieved by the viewer application 120.

An example formula for an ideal recommended using the DFPS rule bit rate is:

$$currentlyDownloadingBitrate * \left(1 - \frac{DFPS}{FPS}\right)$$

The currently downloading bit rate can be determined in the same manner as is used by the bandwidth rule.

Another embodiment of a switching rule is a content utilization rule. The switch manager application 122 can apply the content utilization rule to generate a recommended bit rate based on how the electronic content is being rendered for display or use at the client device 102.

In one embodiment, a content utilization rule can describe a size of a window in which electronic content is being rendered for display or use, where the described window size is relative to the size of the display screen. For example, applying a content utilization rule may generate a higher recommended bit rate for a viewer application rendering electronic content for full-screen display at a client device 102. A lower recommendation for a full-screen display may produce pixeling and/or drain processing power In another embodiment, a content utilization rule can describe a type of display device 116 for which the client device 102 renders the electronic content. Electronic content rendered for display or use at a first display device included in or in communication with the client device 102 can result in a first recommended bit rate. Electronic content rendered for display or use at a second display device included in or in communication with the client device 102 can result in a second recommended bit rate. For example, a lower recommended bit rate can be generated for electronic content being rendered for display or use by a client device 102 using a low resolution screen, such as the screen of a tablet computer, and a higher recommended bit rate can be generated for electronic content being rendered for display or use by the client device 102 using a high resolution, such as a high-definition television coupled to the tablet computer via an high-definition multimedia interface ("HDMI") output.

Another embodiment of a switching rule is a buffering rule. A buffering rule can be used to generate a recommendation based on a buffering state occurring during rendering of the current rendition. A buffering state can indicate that the current rendition is associated with a bit rate that results in unsatisfactory rendering of the electronic content. In one embodiment, the buffering rule involves determining a buffer percentage that describes a percentage of the total buffer size that has already been rendered. If the buffer percentage is below a predetermined threshold, then the buffering rule is applied. Applying a buffering rule can generate a recommendation for a lower quality level than the current rendition. In one embodiment, the buffer percentage may be determined a period of time after a command is issued to change the buffer size. Prematurely determining the buffer percentage may result in unnecessarily recommending a lower quality level. For example, the buffer percentage may be low when the buffer is being filled in response to the command. Computing the buffer percentage while the buffer is being filled may result in an inaccurate buffer percentage thereby resulting in an inappropriate recommendation for a lower quality level.

In additional or alternative embodiments, the switch manager application 122 can avoid aggressive switching behavior by adjusting the ideal bit rate to be closer to the currently downloading one.

Figure 4:
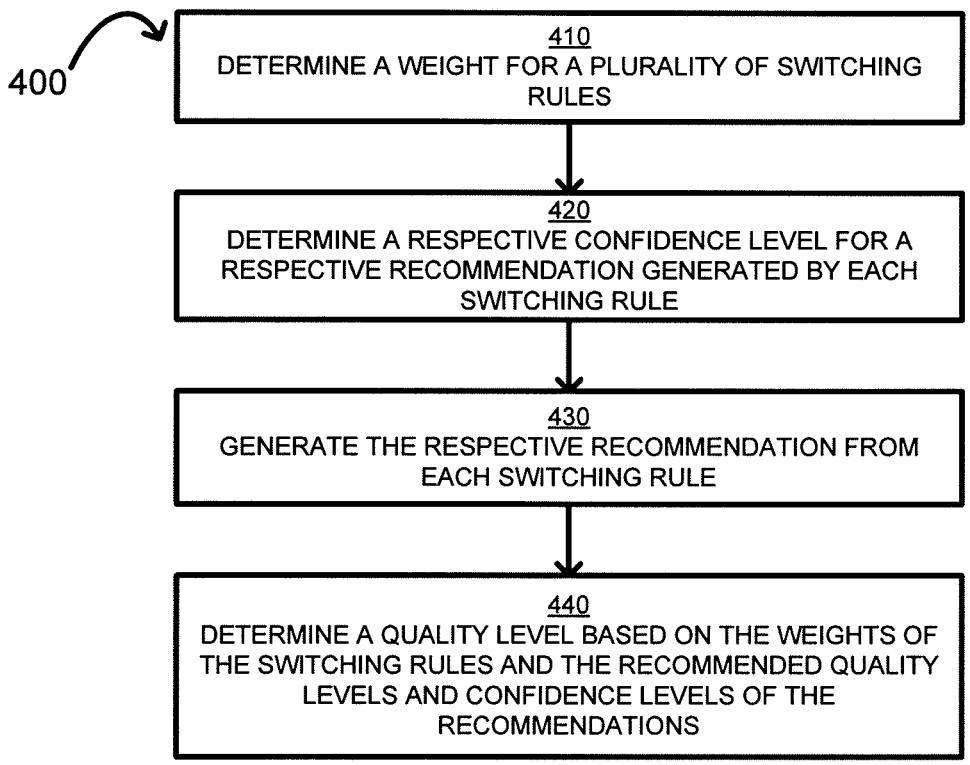
FIG. 4 is a flow chart illustrating an example method for providing adaptive streaming at a client device.

FIG. 4 is a flow chart illustrating an example method 400 for providing adaptive streaming at a client device.

The method 400 involves determining a weight for a plurality of switching rules, as shown in block 410. The switch manager application 122 can be executed by the processor 108 of the client device 102 to determine the weight for the switching rules, as described above with respect to block 310 of method 300.

The method 400 involves determining a confidence level for each respective recommendation generated by each switching rule, as shown in block 420. The switch manager application 122 can be executed by the processor 108 of the client device 102 to determine the confidence levels.

A confidence level for the bandwidth rule can be determined based on the amount of data available relative to the amount of data desired. A bandwidth rule can be used with a bandwidth metric calculated based on n-c available fragments. An example formula for computing the confidence level for a recommendation generated using the bandwidth rule can be:

$$\frac{\text{weight}_0 + \text{weight}_1 + \ldots + \text{weight}_{n-c}}{\text{weight}_0 + \text{weight}_1 + \ldots + \text{weight}_{n-c} \ldots + \text{weight}_{n-1}}$$

The confidence level for a recommendation generated using the bandwidth buffer rule can be determined in the same manner as a confidence level for a recommendation generated using the bandwidth rule.

An example formula for determining the confidence level of a recommendation generated using the DFPS rule is:

$$\frac{DPFPS}{FPS \times \text{max\_DFPS\_Ratio}}$$

In this example, the max_DFPS_Ratio may be a maximum acceptable DFPS ratio.

The method 400 further involves determining a selected quality level based on the respective weights of the switching rules 123 and the respective recommended quality levels and respective confidence levels of the recommendations, as shown in block 430. The switch manager application 122 can be executed by the processor 108 of the client device 102 to generate the recommendations.

The method 400 further involves generating a recommendation from each of the switching rules, as shown in block 430. Each recommendation can include a recommended quality level and a confidence level. The switch manager application 122 can be executed by the processor 108 of the client device 102 to generate the recommendations.

The method 400 further involves determining a quality level based on the respective weights of the switching rules 123 and the respective recommended quality levels and respective confidence levels of the recommendations, as shown in block 440. The switch manager application 122 can be executed by the processor 108 of the client device 102 to determine the selected quality level.

In one embodiment, the switch manager application 122 can determine a selected quality level using the weighted average of the switching rule recommendations. A weight for each recommendation can be represented by the product of the recommendation confidence and the weight of issuing switching rule.

In additional or alternative embodiments, the switch manager application 122 can choose not to select a quality level that is reported to be unreliable by the metrics application 124.

In additional or alternative embodiments, the switch manager application 122 can configure the viewer application 120 to retrieving one the renditions 128a-c from the content provider 104. The retrieved rendition can have a quality level less than or equal to the selected quality level.

In additional or alternative embodiments, each switching rule can be categorized as either a normal switching rule or an emergency switching rule. A normal switching rule can allow the switch manager application to select a rendition with a higher quality level to be increased. A normal switching rule can include one of the switching rules for which recommendations are averaged. Non-limiting examples of normal switching rules can include the bandwidth rule and the bandwidth buffer switching rule. An emergency switching rule can include one or more switching rule for which recommendations are not averaged. Applying an emergency switching rule can generate a recommendation equal to or less than a bit rate for a rendition being rendered by the viewer application. An emergency switching rule can be used to determine whether a bit rate for a rendition being rendered can be sustained. An emergency switching rule can allow the switch manager application 122 to select a rendition with the same or lower quality level. Non-limiting examples of emergency switching rules can include the DFPS rule and the buffering rule.

Figure 5:
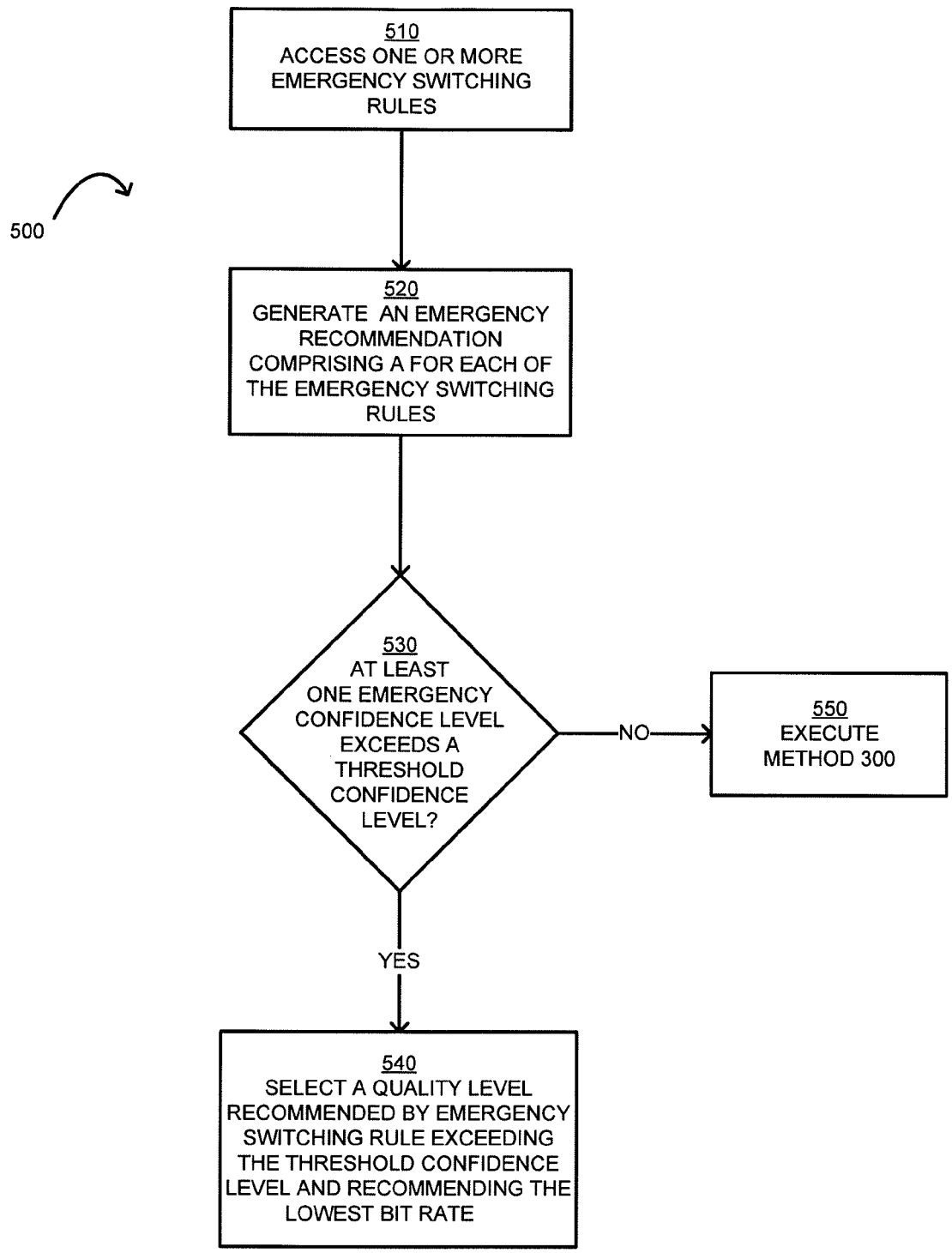
FIG. 5 is a flow chart illustrating an example method for providing adaptive streaming at a client device using emergency rules.

FIG. 5 is a flow chart illustrating an example method 500 for providing adaptive streaming at a client device using emergency rules. For illustrative purposes, the method is described with reference to the system implementations depicted in FIGS. 1-2. Other implementations, however, are possible.

The method 500 involves accessing one or more emergency switching rules, as shown in block 510.

The method 500 further involves generating an emergency recommendation for each of the emergency switching rules, as shown in block 520. Each emergency recommendation can include an emergency quality level and an emergency confidence level.

The method 500 further involves determining whether at least one emergency confidence level exceeds a threshold confidence level, as shown in block 530. If at least one emergency confidence level exceeds a threshold confidence level, the method 500 further involves determining the selected quality level corresponding to the emergency recommendation associated with a lowest bit rate and having the emergency confidence level exceeding the threshold confidence level, as shown in block 540. The switch manager application 122 can select the quality level that is the minimum emergency quality level of any emergency recommendations having a confidence exceeding the threshold confidence level. If none of the emergency confidence levels exceeds the threshold confidence level, the method 500 further involves executing the method 300, as shown in block 550.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:

determining, by a switch manager application executed by a processing device of a client that retrieves streaming content from a server, a first weight for a first switching rule from a plurality of switching rules and a second weight for a second switching rule from the plurality of switching rules, wherein applying each switching rule generates a recommended quality level for electronic content, each weight describing a reliability of the respective switching rule, wherein the second weight indicates that the second switching rule is unreliable and wherein determining the second weight comprises determining that a history of recommended quality levels generated using the second switching rule includes a number of emergency down-switches exceeding a pre-determined threshold, wherein each emergency down-switch comprises selecting, responsive to an event indicating unsatisfactory playback of the electronic content, a rendition having a lower quality level than a current rendition;

determining, by the switch manager application, (i) a first confidence level for a first recommendation generated by the first switching rule and (ii) a second confidence level for a second recommendation generated by the second switching rule, wherein the first confidence level describes a first quantity of first quality-of-service data, wherein the first quality-of-service data is used by the first switching rule to generate recommendations, wherein the second confidence level describes a second quantity of second quality-of-service data, wherein the second quality-of-service data is used by the second switching rule to generate recommendations, wherein the first confidence level differs from the second confidence level based on the first quantity being different from the second quantity;

selecting, by the switch manager application, the first switching rule rather than the second switching rule to generate a recommendation, wherein the first switching rule is selected based at least partially on the first weight of the first switching rule and on the first confidence level of the first switching rule;

applying, by the processing device, the first switching rule and thereby generating a particular recommended quality level for the electronic content; and downloading and playing, by the processing device, a particular rendition of the electronic content corresponding to the particular recommended quality level for the electronic content.

2. The method of claim 1, wherein the first confidence level indicates that the first quality-of-service data is sufficient for the first switching rule to be reliable and the second confidence level indicates that the second quality-of-service data is insufficient for the second switching rule to be reliable.

3. The method of claim 2, further comprising:
determining respective weights for the plurality of switching rules, each weight indicating a respective reliability of the respective switching rule;
for each of the plurality of switching rules, generating, by the switch manager application, a respective recommendation comprising a respective recommended quality level and a respective confidence level; and
determining, by the switch manager application, the particular recommended quality level based on the weights of the plurality of switching rules and the recommended quality levels and respective confidence levels of the recommendations.

4. The method of claim 3, further comprising, wherein the particular rendition has a quality level less than or equal to the particular recommended quality level, wherein a plurality of renditions comprising the particular rendition comprises a plurality of copies of an asset, each copy of the asset being encoded at a different quality level.

5. The method of claim 4, wherein a respective quality level for a respective one of the plurality of renditions corresponds to the respective rendition being encoded using a respective bit rate.

6. The method of claim 1, further comprising,
accessing, by the switch manager application, a subset of the plurality of switching rules, the subset comprising emergency switching rules, wherein each emergency switching rule is limited to recommending an emergency quality level that is less than or equal to the current quality level; and
generating, by the switch manager application and for the emergency switching rules, respective emergency recommendations comprising respective emergency quality levels and respective emergency confidence levels;
determining, by the switch manager application, whether an emergency confidence level exceeds a threshold confidence level; and
performing one of:
determining respective weights of plurality of switching rules and selecting the first switching rule, wherein the respective weights are determined and the first switching rule is selected based on none of the emergency confidence levels exceeding the threshold confidence level, wherein the first switching rule allows the switch manager application to recommend a different quality level that is greater than a current quality level; or
determining a selected quality level corresponding to one of the emergency recommendations associated with a lowest bit rate, wherein the selected quality level is determined based on the one of the emergency recommendations having a corresponding emergency confidence level exceeding the threshold confidence level.

7. The method of claim 1, wherein the respective weight for each of the plurality of switching rules is determined based on one or more of an actual bit rate metric, a bandwidth metric, a buffer fragments metric, and a dropped-frames-per-second metric.

8. The method of claim 1, wherein the plurality of switching rules comprises one or more of:
a bandwidth rule describing a bandwidth of a network connection between a client device including the processing device and a content provider providing the electronic content;
a bandwidth buffer rule describing the bandwidth of the network connection and a minimum amount of electronic content stored in a buffer that is accessible by the client device;
a hardware capabilities rule describing one or more of a battery life, memory capacity, or processing power of the client device;
a content utilization rule describing how the electronic content is being rendered for display or use at the client device; or
a buffering rule describing whether one or more renditions have historically caused depletion of the buffer.

9. A non-transitory computer-readable medium embodying program code executable by a processing device of a client that retrieves streaming content from a server, the program code comprising:
program code for determining a first weight for a first switching rule from a plurality of switching rules and a second weight for a second switching rule from the plurality of switching rules, wherein applying each switching rule generates a recommended quality level for electronic content, each weight describing a reliability of the respective switching rule, wherein the second weight indicates that the second switching rule is unreliable and wherein determining the second weight comprises determining that a history of recommended quality levels generated using the second switching rule includes a number of emergency down-switches exceeding a pre-determined threshold, wherein each emergency down-switch comprises selecting, responsive to an event indicating unsatisfactory playback of the electronic content, a rendition having a lower quality level than a current rendition;
program code for determining (i) a first confidence level for a first recommendation generated by the first switching rule and (ii) a second confidence level for a second recommendation generated by the second switching rule, wherein the first confidence level describes a first quantity of first quality-of-service data, wherein the first quality-of-service data is used by the first switching rule to generate recommendations, wherein the second confidence level describes a second quantity of second quality-of-service data, wherein the second quality-of-service data is used by the second switching rule to generate recommendations, wherein the first confidence level differs from the second confidence level based on the first quantity being different from the second quantity;

program code for selecting the first switching rule rather than the second switching rule to generate a recommendation, wherein the first switching rule is selected based at least partially on the first weight of the first switching rule and on the first confidence level of the first switching rule;

program code for applying the first switching rule and thereby generating a particular recommended quality level for the electronic content; and program code for downloading and playing a particular rendition of the electronic content corresponding to the particular recommended quality level for the electronic content.

10. The non-transitory computer-readable medium of claim 9, further comprising:

program code for generating a selected quality level having a bit rate less than or equal to a recommended bit rate corresponding to the particular recommended quality level.

11. The non-transitory computer-readable medium of claim 10, wherein the first switching rule comprises a dropped-frames-per-second rule and wherein the program code for generating the recommendation comprises program code for determining that a rendition of electronic being rendered is associated with a number of dropped frames exceeding a threshold number of dropped frames.

12. The non-transitory computer-readable medium of claim 10, wherein the first switching rule comprises a buffering rule and wherein the program code for generating the recommendation comprises program code for determining whether one or more renditions of the electronic content rendered for display at a client device have historically caused depletion of a buffer that is accessible by the client device.

13. The non-transitory computer-readable medium of claim 10, wherein the first switching rule comprises a bandwidth buffer rule and wherein the program code for generating the recommendation comprises program code for determining a bandwidth of a network connection between a client device and the server providing the electronic content and a minimum amount of electronic content stored in a buffer that is accessible by the client device.

14. A client computing device comprising:

a non-transitory computer-readable medium storing code providing a switch manager application; and a processor communicatively coupled to the non-transitory computer-readable medium and configured to execute the code to perform operations comprising:

determining a first weight for a first switching rule from a plurality of switching rules and a second weight for a second switching rule from the plurality of switching rules, wherein applying each switching rule generates a recommended quality level for electronic content, each weight describing a reliability of the respective switching rule, wherein the second weight indicates that the second switching rule is unreliable and wherein determining the second weight comprises determining that a history of recommended quality levels generated using the second switching rule includes a number of emergency down-switches exceeding a pre-determined threshold, wherein each emergency down-switch comprises selecting, responsive to an event indicating unsatisfactory playback of the electronic content, a rendition having a lower quality level than a current rendition, determining (i) a first confidence level for a first recommendation generated by the first switching rule and (ii) a second confidence level for a second recommendation generated by the second switching rule, wherein the first confidence level describes a first quantity of first quality-of-service data, wherein the first quality-of-service data is used by the first switching rule to generate recommendations, wherein the second confidence level describes a second quantity of second quality-of-service data, wherein the second quality-of-service data is used by the second switching rule to generate recommendations, wherein the first confidence level differs from the second confidence level based on the first quantity being different from the second quantity, selecting the first switching rule rather than the second switching rule to generate a recommendation, wherein the first switching rule is selected based at least partially on the first weight of the first switching rule and on the first confidence level of the first switching rule, applying the first switching rule and thereby generating a particular recommended quality level for the electronic content, and downloading and playing a particular rendition of the electronic content corresponding to the particular recommended quality level for the electronic content.

15. The client computing device of claim 14, wherein the first confidence level indicates that the first quality-of-service data is sufficient for the first switching rule to be reliable and the second confidence level indicates that the second quality-of-service data is insufficient for the second switching rule to be reliable.

16. The client computing device of claim 15, wherein the non-transitory computer-readable medium stores additional code providing a viewer application, wherein the processor is configured to execute the additional code to perform additional operations comprising:

rendering for display a rendition of electronic content having a respective quality level;

analyzing data associated with rendering the rendition to generate the first quality-of-service data and the second quality-of-service data.

17. The client computing device of claim 14, further comprising a display device configurable by the processor to display the electronic content and wherein the first switching rule comprises a content utilization rule describing whether the electronic content is being rendered for full-screen display at the display device.

18. The client computing device of claim 14, further comprising a display device configurable by the processor to display the electronic content and wherein the first switching rule comprises a content utilization rule describing one or more characteristics of the display device.

* * * * *